United States Patent [19]
Francis et al.

[11] 3,859,427
[45] Jan. 7, 1975

[54] PRODUCTION OF BETA ALUMINA

[75] Inventors: Thomas L. Francis, Belleville; George MacZura, East St. Louis, both of Ill.

[73] Assignee: Aluminum Company of America, Pittsburgh, Pa.

[22] Filed: Nov. 4, 1971

[21] Appl. No.: 195,622

Related U.S. Application Data

[63] Continuation-in-part of Ser. No. 875,273, Nov. 10, 1969, abandoned.

[52] U.S. Cl. .................. 423/600, 106/63, 106/65, 136/153, 106/55, 106/58
[51] Int. Cl. ........................... C01f 7/04, C01f 7/16
[58] Field of Search ........ 423/625, 600; 106/63, 65, 106/55, 58; 136/153

[56] References Cited
UNITED STATES PATENTS

| | | | |
|---|---|---|---|
| 2,019,209 | 10/1935 | Benner et al. ........................ | 106/63 |
| 2,043,029 | 6/1936 | Blau et al. ........................ | 106/65 X |
| 2,154,318 | 4/1939 | Benner et al. ..................... | 106/63 |
| 2,436,005 | 2/1948 | Hopps et al. ......................... | 106/46 |
| 3,261,699 | 7/1966 | Henry .................................. | 106/62 |
| 3,370,017 | 2/1968 | Bergna et al. ................... | 423/625 X |
| 3,468,719 | 9/1969 | Tennenhouse ...................... | 136/153 |

FOREIGN PATENTS OR APPLICATIONS 966,269    7/1964    Great Britain ...................... 106/63

OTHER PUBLICATIONS

Newsome et al., "Alumina Properties," Technical Paper No. 10, Second Revision, 1960, Pages 39–46.

*Primary Examiner*—Herbert T. Carter
*Attorney, Agent, or Firm*—Abram W. Hatcher; John P. Taylor

[57] ABSTRACT

Production of high-purity beta alumina by reacting a critical combination of alumina hydrate or calcined alumina or a mixture of these two, a source of oxide other than aluminum oxide, and a source of fluoride.

13 Claims, 1 Drawing Figure

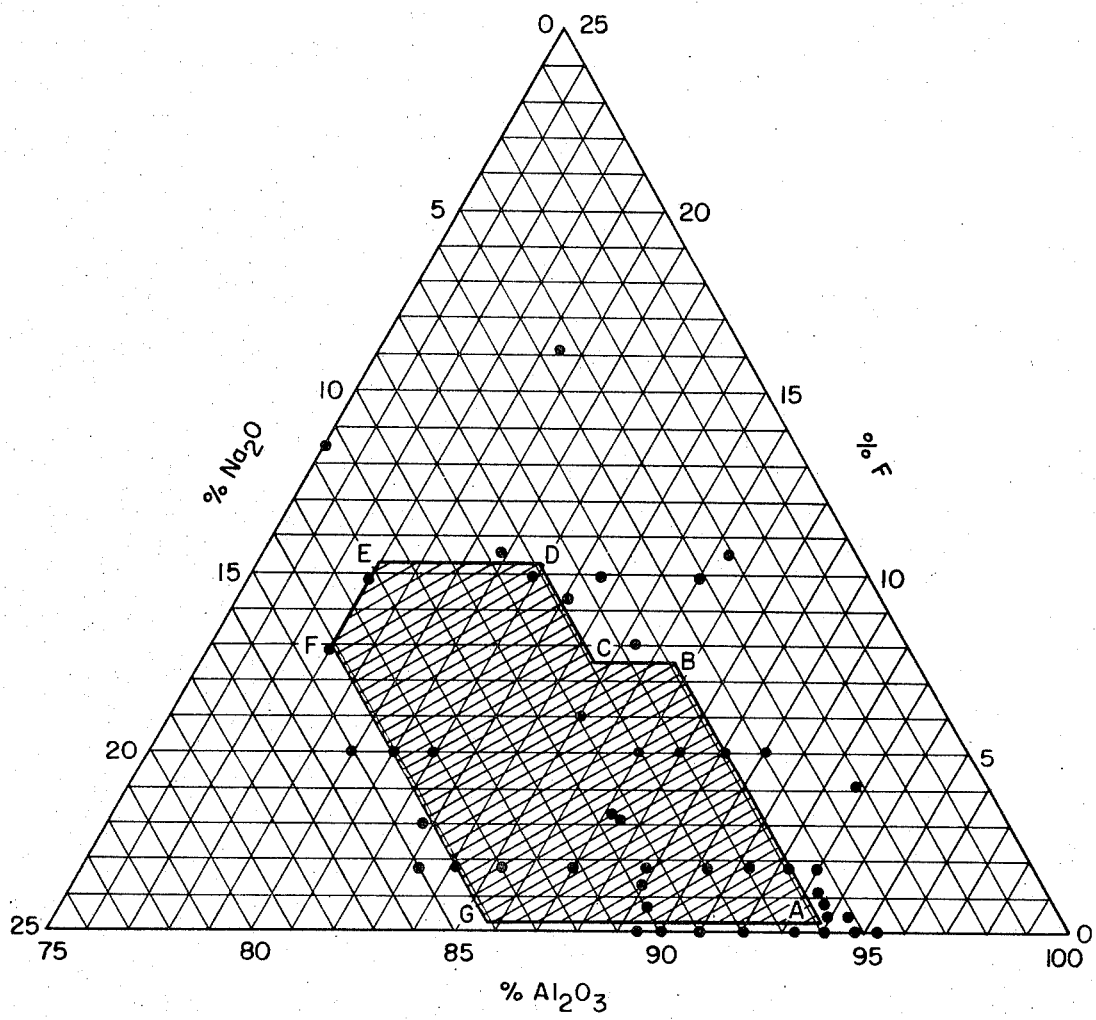

PRODUCTION OF BETA ALUMINA

BACKGROUND OF THE INVENTION

This application is a continuation-in-part application of Ser. No. 875,273, filed Nov. 10, 1969 and now abandoned.

This invention relates to an improved process for preparation of beta alumina. More particularly, it relates to production of beta alumina of particular utility as a solid electrolyte.

Beta alumina is known for use as a refractory due to its high resistance to alkaline atmospheres. Additional interest in beta alumina as a ceramic material has recently been expressed due to its property of exhibiting ion exchange with the cations of molten salts, thereby permitting rapid diffusion of cations. The empirical formula for beta alumina is $M_xO_y \cdot 11Al_2O_3$ wherein $x$ is 1 or 2 and $y$ is 1 or 3, and M represents a cation other than aluminum, for example, Na, Li, Ag, Rb, Ga, Tl, In, $NH_4$, K, Ca, Sr, Pb, Cs, Ba, La, Mg or like cation, usually a metal ion having a valence of not greater than two. Further details as to the well-known structure of beta alumina and its suggested use as a solid electrolyte are given by Kummer and Milberg in the May 12, 1969 issue of Chemical and Engineering News, and by Kummer and Weber in U.S. Pat. No. 3,413,150.

The most common way of preparing a beta alumina for refractories has been by solidifying and cooling a melt of the cationic oxide with alumina, that is, by a procedure commonly referred to as the fused-cast process. In U.S. Pat. No. 2,454,227 Smith, et al., teach preparation of beta alumina by a similar reaction at temperatures not sufficiently high to sinter or fuse the alumina. Saalfeld, at pp. 174–179 of Z. Anorg. allg. Chemie 286 (1956), discloses preparation of beta alumina by reaction of corundum with chiolite ($3AlF_3 \cdot 4NaF$) or cryolite ($AlF_3 \cdot 3NaF$ or $Na_3AlF_6$). Albert and Breit, in "Method for the Rapid Determination of Fluoride Application and Electrolysis of Aluminum," Aluminum Ranshoffen Mitteilungen No. 3, 3 (1955), teach preparation of a mixture of sodium fluoride and beta alumina using, for example, cryolite and sodium fluoride. However, all of these procedures tend to produce other products, for example, impurities, in addition to the beta alumina, thereby creating the desirability of development of a process which would produce principally one product, substantially pure beta alumina, substantially uncontaminated by by-products. Therefore, development of an improved process for production of beta alumina represents a highly desirable result.

SUMMARY OF THE INVENTION

It is accordingly one object of this invention to provide an improved process for production of beta alumina. Another object is to provide a method of preparing beta alumina of a higher purity than heretofore commercially available. Still another object is to provide a method for production of a beta alumina fired shaped object. Further objects will be apparent from the description and claims which follow.

In its broader aspects our invention involves forming beta alumina by reacting a mixture of alumina hydrate or calcined alumina or both, a source of cationic oxide other than aluminum oxide and a different source of fluoride from that for the cationic oxide other than aluminum oxide, all in sufficient amounts to provide certain maximum and minimum amounts of the two oxides and the fluoride as defined hereinbelow in the description of the drawing which forms a part hereof. According to our invention there must be separate and different sources for the oxide other than aluminum oxide and for the fluoride. In other words, the source of fluoride according to our invention cannot be used as the source of the non-alumina oxide and vice versa. There must be at least three separate starting materials reacted to form beta alumina according to our invention.

The median crystal size of the resulting beta alumina is from about 5 to about 15 microns as determined by microscopic appraisal. The alumina hydrate starting material may be Bayer hydrate prepared according to the well-known Bayer process by caustic digestion of bauxite and precipitation of the alumina hydrate from the resulting sodium aluminate solution by seeding, carbonation or other suitable treatment. The starting alumina hydrate is preferably predominantly alpha alumina trihydrate. The calcined alumina which may be used as the starting material in place of or in addition to the alumina hydrate may be prepared by calcining a Bayer or other alumina hydrate. When calcined alumina is included in the starting material, it may be in the alpha or gamma alumina forms or both, used either alone or with the hydrate. The median crystal size of the starting calcined alumina or alumina hydrate ranges from about 0.5 micron to about 6 microns.

According to our process substantially pure beta alumina is produced. By substantially pure we mean of a purity or content of at least 85% by weight beta alumina as determined by X-ray diffraction. The purity of the product may be as high as 99% by weight beta alumina. The density of the beta alumina product when fired ranges from about 1.3 to greater than about 3.2 g/cc.

The cationic oxide may be supplied from any appropriate source other than the source of the fluoride which under the reaction conditions will provide available soda, for example, carbonate, sulfate, nitrate or the like, the carbonate being preferred. Preferred cations of the cationic oxide are the alkali metal ions, although any of the the aforementioned well-known cations are useful according to our process, the preferred ones being sodium and potassium. Preferred cations have a valence of not greater than two. The temperature for reacting the alumina hydrate, calcined alumina or both, cationic oxide source, and fluoride source to produce alumina according to our invention may be as high as 1,600°, our preferred reaction temperature being from about 900° to 1,400°C. It is preferred that the reaction take place in the solid state. The reaction may take place in a static or in a moving bed such as a rotary kiln, and the reaction may be completed in from about 10 minutes to about 30 hours. There is a tendency for the rotary kiln to require less fluoride than a static bed.

Materials such as aluminum fluoride, sodium fluoride, hydrogen fluoride, cryolite, chiolite and the like may be used as the separate source of the fluoride required according to our invention, aluminum fluoride being preferred.

BRIEF DESCRIPTION OF THE DRAWING

The above-mentioned critical amounts of the fluoride source, separate and different oxide source, and the alumina starting material (hereinafter referring to calcined alumina, alumina hydrate, or a mixture of the two) are shown by the drawing which forms a part hereof. The drawing is a three-component graph plotting against one another $Al_2O_3$, $Na_2O$ and F in % by weight of each, the $Na_2O$ being representative of the oxide other than aluminum oxide used according to our invention. The points on the graph were plotted to show various blends of alumina hydrate and/or calcined alumina, an $Na_2O$ source and an F source reacted according to our invention. The blends were fired for about 15 minutes at about 1,400°C. The shaded area encompassed generally by the peripheral line ABCDEFG on the graph represents the critical composition ranges for minimum and maximum amounts of $Al_2O_3$, oxide other than aluminum oxide (here illustratively $Na_2O$), and F which can be used to produce substantially pure (at least 85% by weight) beta alumina according to the process of our invention. The samples of the compositions indicated by points outside Area ABCDEFG produced an alumina which was not of the at least 85% by weight beta alumina content by the X-ray diffraction pattern.

DESCRIPTION OF THE PREFERRED EMBODIMENTS

The following examples are further illustrative of the invention. Examples 1, 2, 6 and 12 illustrate the prior art, and the remaining examples illustrate our invention.

EXAMPLE 1

A mixture of 90% calcined Bayer alumina and 10% $Na_2O$ added as sodium carbonate when heated statically at 1,675°C (25°C above the melting point of sodium aluminate) for 15 minutes yielded a substantially pure sodium beta alumina. The fired density was about 3.2 g/cc.

EXAMPLE 2

The same mixture used in Example 1 when heated statically at 1,400°C for 15 minutes yielded a mixture of primarily sodium zeta alumina ($Na_2O.5Al_2O_3$) and the remainder principally sodium beta alumina ($Na_2O.11Al_2O_3$).

EXAMPLE 3

5 wt % $AlF_3$ was added to the starting mixture in Example 1. The resulting mixture was then heated in a static bed at 1,400°C for 15 minutes. A substantially pure sodium beta alumina was produced.

EXAMPLE 4

The starting material of Example 3 was heated in a static bed at 1,300°C for 15 minutes. A substantially pure sodium beta alumina ($Na_2O.11Al_2O_3$) resulted.

EXAMPLE 5

The starting material of Example 3 was heated at 1,350°C in a rotary kiln. A substantially pure sodium beta alumina ($Na_2O.11Al_2O_3$) resulted.

EXAMPLE 6

When a mixture of 90% by weight $Al_2O_3$ added as Bayer trihydrate and 10% $Na_2O$ added as sodium carbonate was heated in a static bed at 1,350°C. for 15 minutes, a mixture of primarily sodium zeta alumina ($Na_2O.5Al_2O_3$) and a minor amount of sodium beta alumina ($Na_2O.11Al_2O_3$) was produced.

EXAMPLE 7

When 5 wt % $AlF_3$ was added to the starting material of Example 6 and the resulting mixture was heated statically at 1,350°C for 15 minutes, a substantially pure sodium beta alumina ($Na_2O.11Al_2O_3$) was produced.

EXAMPLE 8

When 1 wt % $AlF_3$ was added to the starting material of Example 6 and the resulting mixture was heated at 1,350°C in a rotary kiln, a substantially pure sodium beta alumina ($Na_2O.11Al_2O_3$) was produced.

EXAMPLE 9

The material formed in Example 5 was pressed into a wafer at 5,000 psi and fired at 1,700°C for 1 hour. The fired density of the product was 1.27 g/cc.

EXAMPLE 10

The material formed in Example 5 was ground (500 g charge with 6,000 g alumina balls in 1.3 gal mill at 70 rpm) for 16 hours, pressed at 5,000 psi and then fired at 1,600°C for 1 hour. The fired density of the product was 2.33 g/cc.

EXAMPLE 11

The material formed in Example 5 was dry ground (300 g charge with 6,000 g alumina balls in 1.3 gal mill at 70 rpm) for 16 hours with 2 wt% isostearic acid, pressed at 5,000 psi and then fired for 1 hour at either 1,600° or 1,700°C in the presence of unground starting material. Properties obtained by the grinding procedures including those of resulting pressed (green) and fired products were as follows:

| Temperature | Bulk Density — g/cc | | Diameter Shrinkage — % |
|---|---|---|---|
| | Green | Fired | |
| 1600°C | 2.05 | 3.02 | 12.2 |
| 1700°C | 2.04 | 3.17 | 13.6 |

The small but effective amount of isostearic acid used in this example is representative of long-chain organic fatty acids and their esters and salts which may be used in grinding beta alumina prepared and used according to our invention. An alcohol such as described in U.S. Pat. No. 3,358,937 may also be used.

Example 12

Compositions respectively containing 14% cryolite and 86% $Al_2O_3$, and 19.3% cryolite and 80.7% $Al_2O_3$ were prepared. Both resulting mixtures were fired in separate firings at 1,000° and 1,200°C. Each firing was for 3 hours. The results are given in the following table.

| $Na_3AlF_6$ Content | Temp. °C | Qualitative X-ray | | | $\alpha$-$Al_2O_3$[1] % |
|---|---|---|---|---|---|
| | | $\beta$-$Al_2O_3$ | $\alpha$-$Al_2O_3$ | NaF | |
| 14.0 | 1000 | medium | major | minor | 56 |
| 19.3 | 1000 | medium | major | minor | 68 |
| 14.0 | 1200 | major | medium | N.D.[2] | 23 |
| 19.3 | 1200 | major | minor | N.D.[2] | 5 |

[1]difference between this figure and 100 represents the maximum amount of $\beta$-$Al_2O_3$ possible in the product
[2]Not Detectable While the invention has been described in terms of preferred embodiments, the claims appended hereto are intended to encompass all embodiments which fall within the spirit of the invention.

Having thus described our invention and certain preferred embodiments thereof, we claim:

1. A process for production of beta alumina which comprises reacting at a temperature of from about 900-1600°C each of the components of a ternary mixture of (1) a separate source of alumina, (2) a separate fluoride source and (3) a separate source of an oxide other than aluminum oxide selected from the group consisting of alkali metal oxides and alkaline earth metal oxides in an amount sufficient to provide the percentages of alumina calculated as $Al_2O_3$, fluoride calculated as F and oxide other than aluminum oxide calculated as % alkali metal oxide or alkaline earth metal oxide, defined by the area encompassed by line ABCDEFG of the drawing in which % $Na_2O$ illustrates the permissible range of said alkali metal oxide and alkaline earth metal oxide other than aluminum oxide, thereby forming an alumina of at least 85% by weight beta alumina, and collecting the resulting product.

2. The process of claim 1 wherein the reactants are reacted in the solid state.

3. The process of claim 1 wherein the source of fluoride is aluminum fluoride.

4. The process of claim 1 wherein the separate source of an oxide is obtained by use of sodium carbonate or potassium carbonate.

5. The process of claim 1 wherein the mixture is reacted for from about 10 minutes to about 30 hours.

6. The process of claim 1 wherein the reactants are calcined at a temperature of from about 900°C to about 1,400°C and the oxide other than aluminum oxide is sodium oxide, potassium oxide or lithium oxide.

7. The process of claim 6 wherein the oxide other than aluminum oxide is sodium oxide.

8. The process of claim 1 wherein the alumina hydrate or calcined alumina has a median crystal size of from about 0.5 micron to about 6 microns.

9. The process of claim 1 wherein the alumina hydrate or calcined alumina contains at least 50% by weight alpha alumina.

10. The process of claim 1 wherein the separate source of oxide is an alkali metal oxide.

11. The process of claim 1 wherein said separate fluoride source is selected from the group consisting of aluminum fluoride, sodium fluoride, hydrogen fluoride, cryolite and chiolite and said alkali metal oxide source is a sodium oxide source.

12. A process for producing an alumina of at least 85% by weight beta alumina which comprises: reacting at a temperature of from 900-1600°C each of the components of a ternary mixture of:

(1) at least one substance selected from the group consisting of alumina hydrate and calcined alumina;

(2) a separate fluoride source; and (3) a separate source of sodium oxide in an amount sufficient to provide the percentages of alumina calculated as $Al_2O_3$, fluoride calculated as F, and sodium oxide defined by the area encompassed by line ABCDEFG of the drawing; thereby forming an alumina of at least 85% by weight beta alumina.

13. The process of claim 12 wherein said separate fluoride source comprises aluminum fluoride, sodium fluoride, hydrogen fluoride, cryolite, or chiolite.

* * * * *